Patented Nov. 11, 1924.

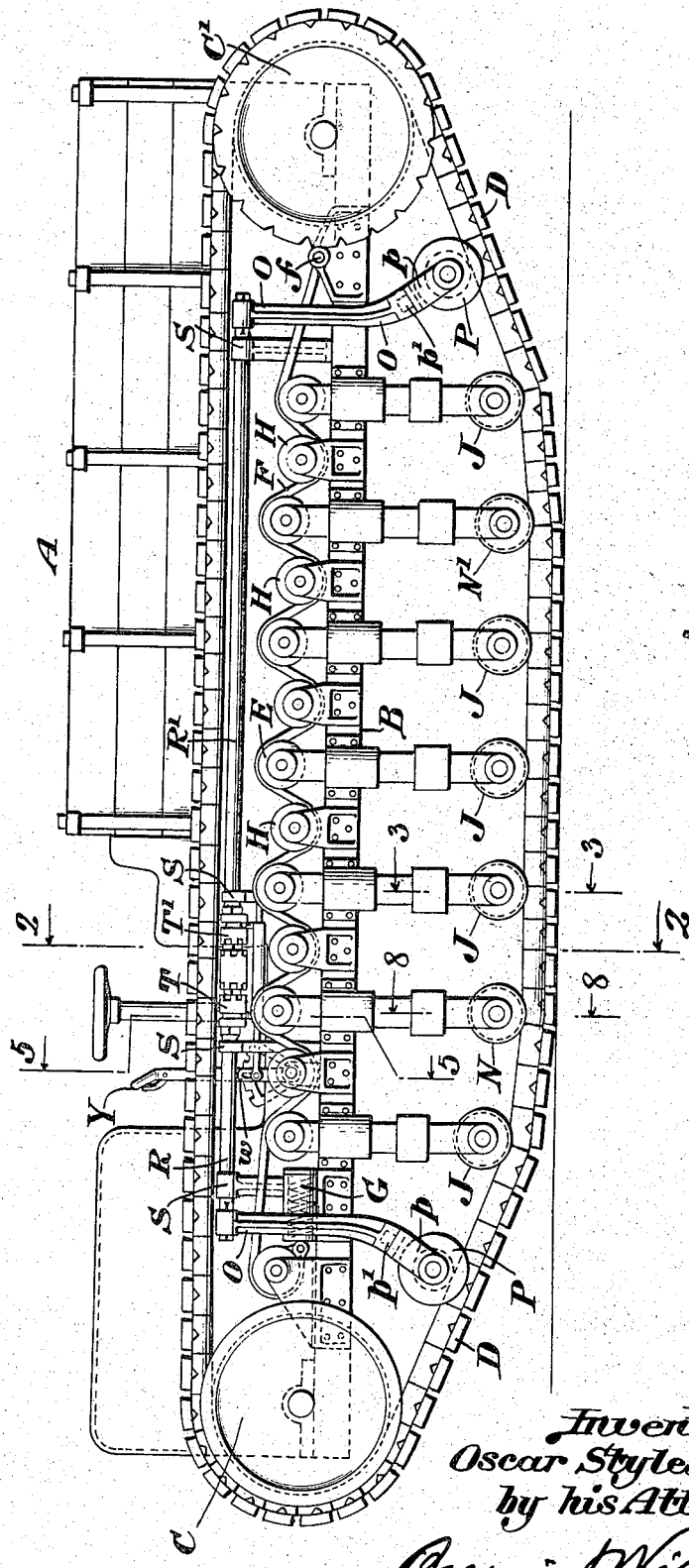

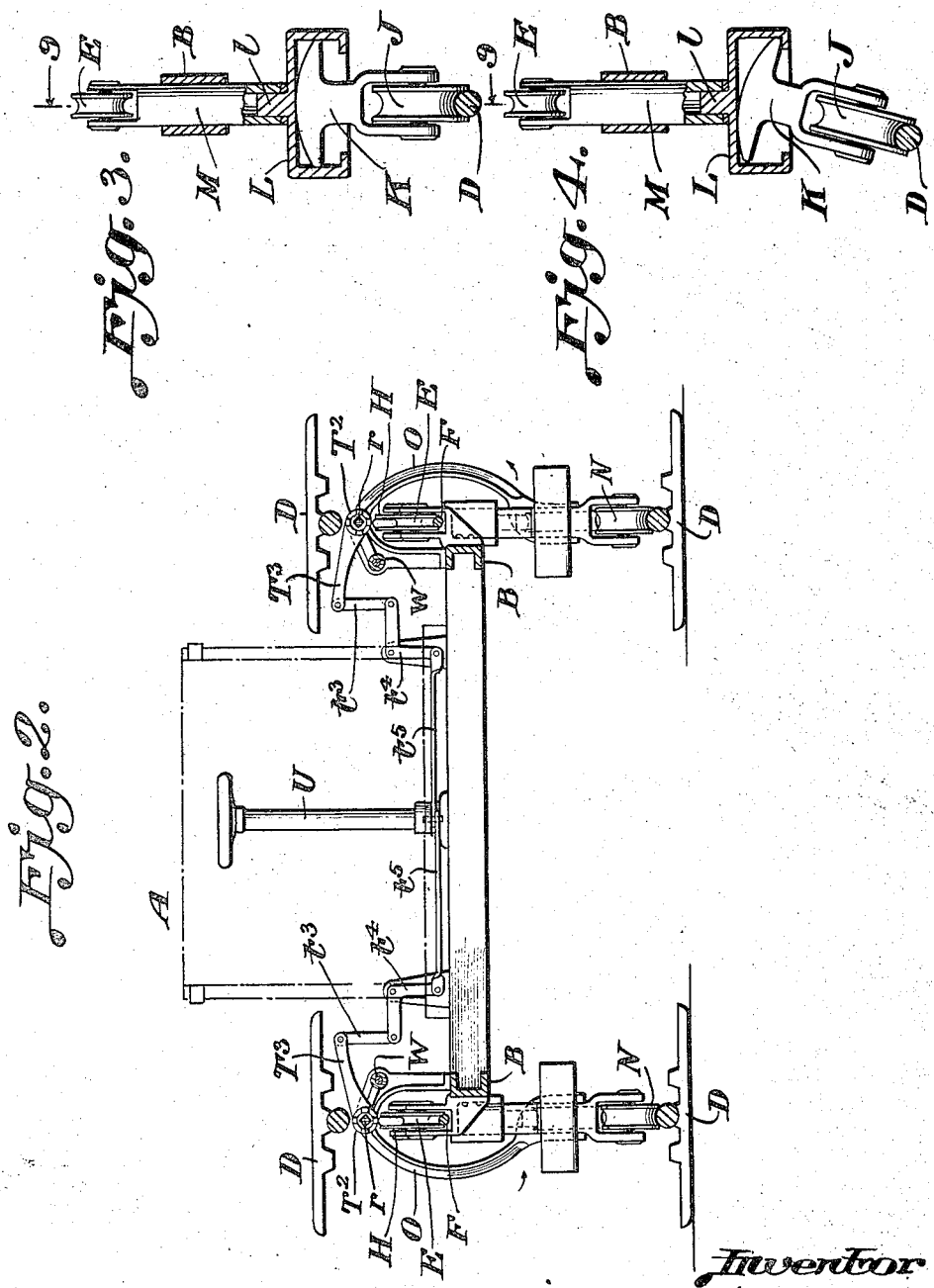

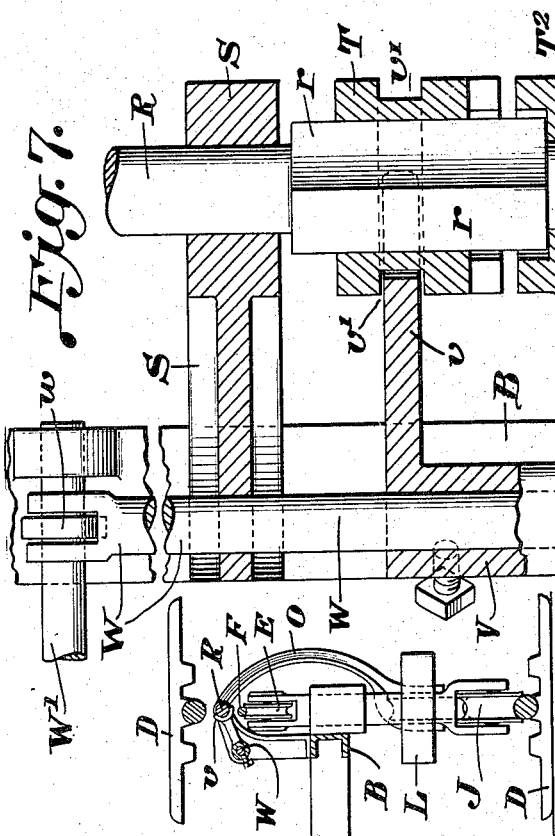
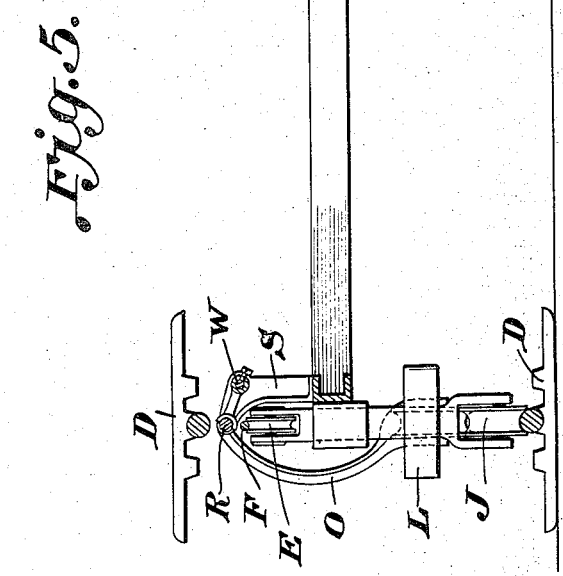
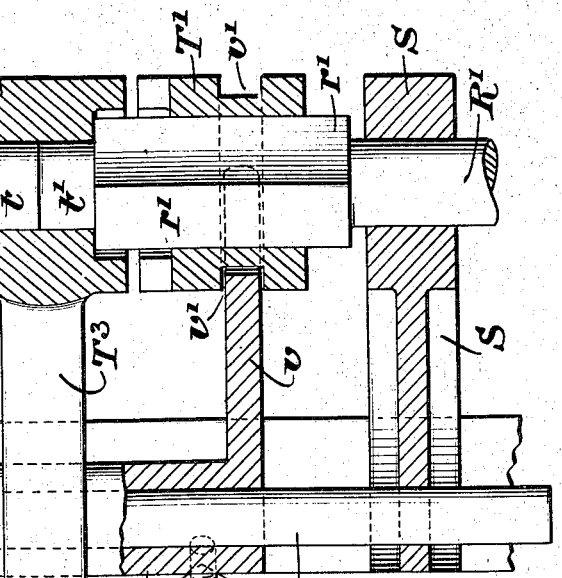
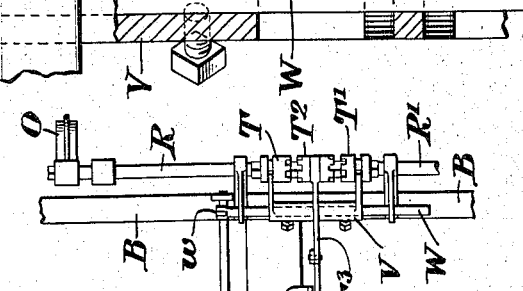

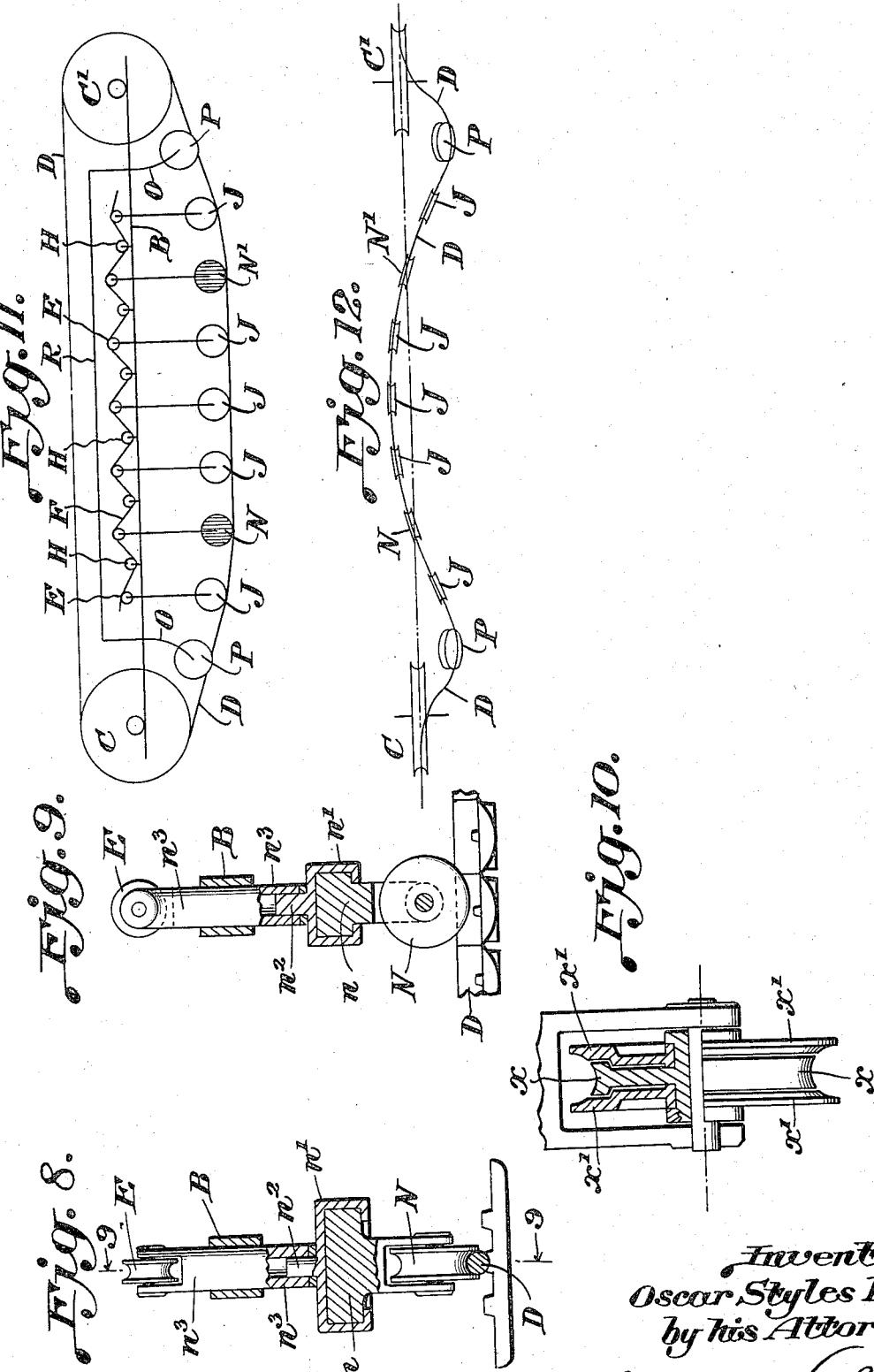

1,515,167

UNITED STATES PATENT OFFICE.

OSCAR STYLES PENN, OF LONDON, ENGLAND, ASSIGNOR TO ROADLESS TRACTION, LIMITED, OF LONDON, ENGLAND, A CORPORATION OF GREAT BRITAIN AND IRELAND.

ENDLESS-TRACK VEHICLE.

Application filed April 17, 1923. Serial No. 632,619.

*To all whom it may concern:*

Be it known that I, OSCAR STYLES PENN, a subject of the King of Great Britain, residing at Wadsworth Common, London, England, have invented certain new and useful Improvements in Endless-Track Vehicles, of which the following is a specification.

This invention relates to motor vehicles of the class in which endless tracks or tractor belts carried by driving and idle pulleys are employed, and the principal object of the invention is to provide improved means for supporting and guiding or steering the vehicle.

Vehicles of this kind have heretofore been supported by bogie wheels resting on tractor belts which are laterally flexible, and in such vehicles the belts have been bent or flexed laterally for steering and other purposes.

According to my invention I provide novel means which engage the lower runs of the belts and which are connected with devices for shifting them laterally in such manner as to bend the belts in the desired direction and to thus steer the vehicles. Preferably I employ for this purpose wheels or rollers which engage the belts and which are mounted on arms connected with rock shafts provided with suitable operating means. The mechanism is such that the vehicle may be steered when traveling in either direction, and the body supporting devices are such as to allow perfect freedom of movement of the belts both vertically and laterally to accommodate varying conditions.

My improvements are illustrated in the accompanying drawings in which—

Figure 1 is a side elevation of an endless track vehicle embodying my improvements.

Figure 2 is a transverse section on the line 2—2 of Figure 1 looking in the direction of the arrows.

Figure 3 is a section showing one of the body-supporting devices comprising a bogie wheel or roller so mounted that it may move vertically and laterally and also pivot about a vertical axis.

Figure 4 is a view similar to Figure 3 showing the bogie wheel in laterally moved position.

Figure 5 shows a vertical section on the line 5—5 in Figure 1.

Figure 6 is a plan view of parts of the mechanism partially illustrated in section in Figure 5.

Figure 7 is a detail view on an enlarged scale of certain clutch mechanism that is used.

Figure 8 is a vertical section of one of the body-supporting devices which, while mounted to move vertically, and to pivot about a vertical axis, has no lateral movement.

Figure 9 is another detail view of the body-supporting device shown in Figure 8.

Figure 10 is a detail view, illustrating one form of track engaging wheel or roller that may be employed.

Figure 11 is a diagrammatic view, illustrating the arrangement of the bogie wheels, the wheels as shown as hatched being wheels that are pivotally mounted but have no lateral swinging movement.

Figure 12 is a diagrammatic view, illustrating how the tracks are bent for steering purposes and how two of the bogie wheels, while movable pivotally about a vertical axis, have no lateral swinging movement.

My invention may be applied to endless track vehicles of various kinds, either those known as whole track machines, in which the entire vehicle body is supported on tractor belts or those known as half track machines in which the front portion of the vehicle body is supported on wheels of the ordinary kind while the rear portion is supported on tractor belts.

I have shown in the drawings my improvements applied to vehicle bodies supported entirely by endless tracks. The vehicle body or chassis A may be of any suitable construction. It has a sub-frame B beneath the floor of the body to support the bogie wheels hereinafter described. The sprocket pulleys C, C', as shown, are mounted in bearings on the sub-frame B and these pulleys support endless tracks or tractor belts D of suitable construction, which are so made as to bend suitably to pass around the pulleys and also to bend or flex laterally. In order to thus enable the belts to bend both laterally and vertically I may employ mechanism of the kind shown in U. S. Letters Patent No. 1,434,630, of Nov. 7, 1922, and No. 1,440,243 of Dec. 26, 1922, granted to Roadless Traction Limited as the assignee of George John Rackham. The details of construction are not illustrated but are merely indicated.

In order to support the vehicle body on the tractor belts I employ, on each side of the vehicle, a plurality of bogie wheels or rollers. Some of these rollers are mounted to move both vertically and laterally as well as about vertical axes while others are mounted to move vertically and about vertical axes but have no lateral swinging movement, or only a limited lateral movement. All of the rollers, as shown in Figure 1, have upwardly extending posts carrying at their upper ends rollers E over which extends a rope, cable or chain F attached at one end $f$ to a bracket on the sub-frame B and at the other end to a spring G. This rope suspension is now of well known construction and operation. The rope or cable F extends under rollers H, carried in brackets projecting upwardly from the sub-frame B and by the construction shown, as will be readily understood, the vehicle body is yieldingly supported. The bogie rollers marked J on each side of the vehicle are so mounted that they may move vertically; may also move about a vertical axis and in addition have a laterally swinging movement. Each of such rollers is mounted in the manner shown in Figures 3 and 4. Each roller is journaled in the bifurcated end of a support K, arranged within a housing L in such manner as to permit it to rock sidewise. This housing is formed with a vertically extending boss $l$ which extends into and is free to turn in a sleeve M mounted in the main frame B. This sleeve carries, at its upper end, a roller E which engages the rope or cable F in the manner before described. An inspection of Figures 3 and 4 will show that the roller with the sleeve M may move vertically in the frame B. The roller with the housing L may turn about a vertical axis by reason of the pivotal connection of the boss $l$ with the sleeve and the roller may swing laterally with the track D by reason of the construction of the roller support K and its arrangement in the housing L. It will be observed that the support K has a rounded upper portion which engages the upper part of the housing L and it has laterally projecting arms which hold it in proper relation with the housing.

As before stated rollers mounted in the manner indicated in Figures 3 and 4 are used on opposite sides of the machine, and I also employ other bogie rollers marked N, N' which are mounted to move vertically relatively to the vehicle body and to turn about a vertical axis but they have no laterally swinging movement or only a limited lateral movement. These are what I call control rollers as they control the bending operation in the manner indicated diagrammatically in Figure 12. The mountings of these rollers are shown in Figures 8 and 9. Each roller is mounted in a support $n$, the upper end of which is enlarged and contained within a housing $n'$ having a vertically extending boss $n^2$ projecting into and free to turn in a sleeve $n^3$ mounted to move vertically in the main frame B. Each sleeve $n^3$ carries a roller E similar to those before described over which the rope or cable F extends in the manner indicated in Figure 1. These rollers N, N', as indicated in the diagram, Figure 12, are preferably not moved laterally out of line with the driving and idle pulleys C, C' while the rollers J are so mounted that they may move laterally in the manner indicated. The best results are obtained by employing control rollers operating in the manner above described.

In the drawings I have shown five rollers J adapted to move laterally and two rollers N, N' which have little or no lateral movement, but the number and arrangement may be modified without departing from the invention.

When the vehicle body is supported in the manner above described, the bogie wheels J have perfect freedom of movement with the flexible tracks while the bogie wheels N, N' control the bending the tracks.

I have provided novel mechanism for steering the vehicle by bending the tracks laterally or laying them down in a curve. For this purpose I provide track-bending devices which may be operated by the driver or in any suitable way so as to properly steer the vehicle in either direction. Preferably I employ the mechanism shown in the drawings. At one end of the vehicle on each side I provide a track-engaging roller P which is mounted in a support $p$ pivotally connected at $p'$ with an arm O, attached to a rock shaft R. At the other end of the vehicle I employ similar devices, similarly lettered, attached to a rock shaft R'. These rock shafts are supported in brackets S suitably spaced and mounted on the sub-frame B, and each of these rock shafts has a squared portion $r$, $r'$ extending through a clutch member T, or T' and each shaft R, R' has a cylindrical boss $t$, $t'$ arranged within a clutch member T². It will be observed that the bosses $t$, $t'$ are arranged end to end and the shafts R and R' may be turned independently. Figure 7 shows the clutch members T, T' and T² in neutral position, the several members being disconnected from each other but either of the members T, T' may be made to operatively engage the member T² when desired. In order to rock either one of the rock shafts I may employ suitable mechanism of well known construction. Preferably the central clutch member T², which turns on the bosses t t' is formed with an arm T³ connected by a link t³ to a bell crank lever t⁴ pivoted to a bracket of the vehicle body and connected by a link t⁵ with the steering mechanism indicated at U. By operating the steering mechanism through the connections shown, the central clutch member T² may be turned on the bosses t, t' and may thus turn the rock shaft R or R' with which it is connected. When a rock shaft, such as the rock shaft R, is thus turned it will move the arm O laterally in either direction. This will bend the track with which the arm is connected, in the manner indicated in Figure 12. No positive turning movement is given to the arm O at the opposite end of the vehicle but such arm follows the movement of the track, it being understood that the bending of the track is controlled by the rollers N, N' which have no lateral movement while the rollers J follow the lateral movement of the track in the manner indicated in the diagram. In this way, by bending the track laterally or laying it down in a curve the vehicle can be properly steered and it may be steered when moving in either direction by properly setting the clutch mechanism. In order to thus set the clutch mechanism I preferably employ the devices indicated in the drawings. By referring to Figure 7 it will be observed that there is a sleeve V bolted to a rod W mounted to move endwise in the brackets S and this sleeve V carries a fork v, the arms of which enter annular grooves v' in the clutch members T, T'. By moving the rod W endwise either the clutch member T or the clutch member T' may be made to engage the central clutch member T². In order to move the rod W endwise I may employ a lever Y, the movement of which is controlled by suitable detent mechanism and which is connected to a shaft W' carrying arms w, in turn connected to the rods W. The construction and operation is simple and is clearly indicated in the drawings. A suitable endwise movement may be given to the rod W to shift the clutch mechanism to enable the machine to be properly steered when moving in either direction.

In Figure 10 I have illustrated a wheel or roller forming part of the operating mechanism which may be employed at P in Figure 1. In this case the wheel has a tread portion x and side flanges x' which are movable independently of the tread, the side flanges being mounted to turn on the hub of the tread portion. By this construction the tread portion of the wheel and the side portions which move sidewise with the track may be so mounted that they can revolve at different speeds in order that the side thrust may be dealt with as rolling friction instead of as sliding friction which may occur when the flanges and tread are integral. The wheels or rollers J, N and N' may be similarly constructed.

It will be observed by reference to Figure 1 that the operating rollers P engage those portions of the tractor belts at each end which are raised above the ground so that the tracks may be readily bent or flexed laterally and the bogie wheels J will follow the tracks sidewise or laterally when they are thus bent.

While I have shown preferred devices for carrying out my invention it will be understood that equivalent mechanism for some of the parts, well known in the art, may be substituted.

I claim as my invention.

1. An endless track vehicle equipped with track supporting wheels and laterally flexible tracks and provided with means directly engaging the lower runs only of the tracks for positively bending the tracks laterally.

2. An endless track vehicle equipped with track supporting wheels and laterally flexible tracks, and provided with means directly engaging the lower runs of the tracks at points removed from the peripheries of the wheels for positively bending the tracks laterally.

3. An endless track vehicle equipped with track supporting wheels and laterally flexible tracks, and provided with laterally movable body supporting devices engaging the lower runs of the tracks and laterally movable means directly engaging the lower runs only of the tracks for positively bending the tracks laterally.

4. An endless track vehicle equipped with track supporting wheels and laterally flexible tracks and provided with body supporting devices which are mounted to move vertically and to turn about vertical axes and to also move laterally with the tracks, and laterally movable means engaging directly the lower runs only of the tracks for positively bending the tracks laterally.

5. An endless track vehicle comprising a vehicle body, laterally movable tracks associated therewith, body supporting rollers engaging the tracks which are mounted to move about vertical axes and shift laterally with the tracks cross-wise of the vehicle, and means directly engaging the lower runs only of the tracks for positively bending the tracks laterally.

6. An endless track vehicle comprising a vehicle body, laterally flexible tracks associated therewith, vertically movable body-supporting devices engaging the lower runs of the tracks which are mounted to move laterally with the tracks, and laterally movable devices engaging the tracks for bending them laterally.

7. An endless track vehicle comprising a vehicle body, laterally flexible tracks associated therewith, body-supporting devices engaging the lower runs of the tracks and mounted to move laterally therewith, rollers engaging the lower runs of the tracks above the ground level, laterally movable arms on which the rollers are mounted, and means for moving these arms laterally to bend the tracks.

8. An endless track vehicle comprising a vehicle body, laterally flexible tracks associated therewith, body-supporting devices engaging the lower runs of the tracks and connected with the vehicle body, means at opposite ends of the vehicle for bending the tracks, and mechanism for operating the track-bending devices at either end of the vehicle.

9. An endless track vehicle comprising a vehicle body, laterally flexible tracks associated therewith, laterally movable body-supporting devices engaging the tracks and connected with the vehicle body, and other body-supporting devices connected with the vehicle body which have no lateral movement but which are mounted to turn about vertical axes.

10. An endless track vehicle comprising a vehicle body, laterally flexible tracks associated therewith, body-supporting devices engaging the tracks mounted to move about vertical axes and to move laterally with the tracks, body-supporting devices interposed between those first mentioned mounted to turn about vertical axes but which have no lateral movement, and means carried by the vehicle for bending the tracks laterally for steering purposes.

11. An endless track vehicle comprising a vehicle body, laterally flexible tractor belts associated therewith, body-supporting devices engaging the lower runs of the belts which are connected with the vehicle body and are mounted to move laterally with the tracks, to move vertically therewith and to turn about vertical axes, other body-supporting devices engaging the lower runs of the belts connected with the vehicle body and mounted to move vertically and to turn about vertical axes without moving laterally with the tracks, and means carried by the vehicle body for bending the tracks laterally.

12. An endless track vehicle comprising a vehicle body, laterally flexible tracks associated therewith, body-supporting devices engaging the lower runs of the tracks and connected with the vehicle body, rollers engaging the track at opposite ends thereof, laterally movable arms on which these rollers are mounted, shafts to which the arms are secured, clutch mechanism interposed between the shafts, and arms connected with the clutch mechanism for turning the shafts and for thus moving the track-engaging rollers laterally.

13. An endless track vehicle comprising a vehicle body, laterally flexible tracks, vertically movable body supporting devices engaging the lower runs of the tracks on which the vehicle body is supported, means carried by the vehicle for bending the tracks laterally comprising rock shafts carried by the vehicle and having arms carrying track engaging rollers having tread portions and side flanges which are movable independently of each other.

14. An endless track vehicle comprising a vehicle body, endless tractor belts associated therewith, body-supporting and track bending devices connecting the vehicle body with the lower runs of the tractor belts, said body-supporting and track bending devices being provided with track engaging rollers having tread portions and side flanges movable independently of the tread portions.

15. An endless track vehicle equipped with laterally flexible tracks and with track engaging members held against material lateral movement which engage end portions of the tracks between the middle part and the end portions thereof and aid in controlling the lateral bending of the tracks.

16. An endless track vehicle comprising a vehicle body, laterally flexible tracks, body supporting devices engaging the lower runs of the tracks and connected with the vehicle body and track engaging members having no material lateral movement which engage end portions of the tracks between the middle part and the end portions thereof and aid in controlling the lateral bending of the tracks.

17. An endless track vehicle comprising a vehicle body, laterally flexible tracks associated therewith, body supporting devices engaging the tracks and connected with the vehicle body and other body supporting devices connected with the vehicle body which have no material lateral movement and which engage end portions of the tracks between the middle part and the end portions thereof and aid in controlling the lateral bending of the tracks.

In testimony whereof, I have hereunto subscribed my name.

OSCAR STYLES PENN.